(12) United States Patent
Wall

(10) Patent No.: US 8,863,397 B2
(45) Date of Patent: Oct. 21, 2014

(54) COMBINATION GAUGE FOR MEASURING THE THICKNESS OF ROOFING SHINGLES, METAL ROOFING PANELS, AND VINYL SIDING

(76) Inventor: Daniel Wall, Clayton, NC (US)

(*) Notice: Subject to any disclaimer, the term of this patent is extended or adjusted under 35 U.S.C. 154(b) by 253 days.

(21) Appl. No.: 13/572,181

(22) Filed: Aug. 10, 2012

(65) Prior Publication Data

US 2013/0036618 A1    Feb. 14, 2013

Related U.S. Application Data

(60) Provisional application No. 61/522,397, filed on Aug. 11, 2011.

(51) Int. Cl.
*B43L 7/00* (2006.01)
*G01B 3/38* (2006.01)

(52) U.S. Cl.
CPC .................................... *G01B 3/38* (2013.01)
USPC ........................................... 33/494; 33/563

(58) Field of Classification Search
USPC .......... 33/485, 494, 613, 645, 646, 647, 648, 33/649, 563, 879.1
See application file for complete search history.

(56) References Cited

U.S. PATENT DOCUMENTS

| | | | | |
|---|---|---|---|---|
| 2,887,781 | A * | 5/1959 | Mills | 33/648 |
| 4,879,818 | A * | 11/1989 | Beaulieu | 33/646 |
| 7,513,058 | B2 * | 4/2009 | Cahalane | 33/494 |
| 2001/0034954 | A1 * | 11/2001 | Medford et al. | 33/759 |
| 2006/0196070 | A1 * | 9/2006 | Walchak | 33/647 |
| 2009/0188124 | A1 * | 7/2009 | Chua | 33/563 |
| 2013/0031867 | A1 * | 2/2013 | Duquette et al. | 33/647 |

* cited by examiner

*Primary Examiner* — G. Bradley Bennett
(74) *Attorney, Agent, or Firm* — Coats and Bennett PLLC

(57) ABSTRACT

A gauge is provided for measuring the thickness of roofing shingles and vinyl siding. The gauge includes a main body having at least two elongated slots, one slot functioning to receive and measure the thickness of roofing shingles and the other slot functioning to receive and measure the thickness of vinyl siding. Both slots are open from a respective edge of the main body and include a width that progressively decreases from the open edge to a terminating point in the slot.

11 Claims, 2 Drawing Sheets

COMBINATION GAUGE FOR MEASURING THE THICKNESS OF ROOFING SHINGLES, METAL ROOFING PANELS, AND VINYL SIDING

This application claims priority under 35 U.S.C. §119(e) from the following U.S. provisional application: Application Ser. No. 61/522,397 filed on Aug. 11, 2011. That application is incorporated in its entirety by reference herein.

FIELD OF THE INVENTION

The present invention relates to combination gauge instruments and more particularly to a gauge instrument configured to measure the thickness of roofing shingles, metal roofing panels and vinyl siding.

BACKGROUND OF THE INVENTION

Insurance adjusters devote a great deal of time in investigating insurance claims for damage to buildings, particularly residential dwellings. While there is a wide range of potential claims, exterior damage claims relating to damaged roofs and damaged vinyl siding make up a substantial part of these claims. In cases where there is roof damage, the insurance agent is required to determine the quality of the roofing shingle damaged. That is the insurance agent determines if the damaged roofing shingle is, for example, a 20 year roofing shingle, a 30 year roofing shingle, or a 40 year roofing shingle. This is important because this determination will be a factor in determining the value of the claim. In some cases, the damaged roof may include metal roofing panels. Here again, it is important to determine the quality of the damaged metal roofing panel and as with a conventional roofing shingle, the thickness of the metal roofing panel is a factor in determining quality and in turn the value of the claim. The same applies for vinyl siding. When there is a damage claim based on damage to vinyl siding, the insurance adjuster typically determines the thickness of the damaged vinyl siding because here again the thickness of the damaged vinyl siding is a factor in determining a fair amount for the claim.

Therefore, there has been and continues to be a need for a precision gauge instrument that will enable an insurance agent to quickly, easily and precisely determine the thicknesses of various exterior building products such as roofing shingles, metal roofing panels, and vinyl siding.

SUMMARY OF THE INVENTION

The present invention relates to a simple, compact, easy to use hand held gauge for measuring the thickness or gauge of various exterior building products such as roofing shingles, metal roofing panels, and vinyl siding. The gauge of the present invention includes two elongated slots where in one embodiment, one slot is dedicated to measuring the thickness of roofing shingles and the other slot is dedicated to measuring the thickness of vinyl siding. Each slot includes an open end and a closed end. From the open end towards the closed end, the slot becomes progressively narrower. Indicia is placed or inscribed along each slot and this indicia is utilized in determining the thickness of the building component being measured. For example, in the case of a roofing shingle, a small specimen or sample of a damaged roofing shingle is inserted into the open end of the designated slot and the roofing and the specimen is moved from the open end towards the closed end. At some point the slot will close on the specimen or sample and it is that point and the adjacent indicia that indicates the thickness of the specimen roofing shingle. Furthermore, the gauge of the present invention includes a series of relatively short slots formed in one or more edges of the gauge instrument. These short slots include two parallel sides having a constant thickness. In one embodiment, three separate slots are provided for measuring the thickness of a metal roofing panel.

Other objects and advantages of the present invention will become apparent and obvious from a study of the following description and the accompanying drawings which are merely illustrative of such invention.

BRIEF DESCRIPTION OF ATTACHED PHOTOGRAPHS

DESCRIPTION OF EXEMPLARY EMBODIMENTS

Figure 1:
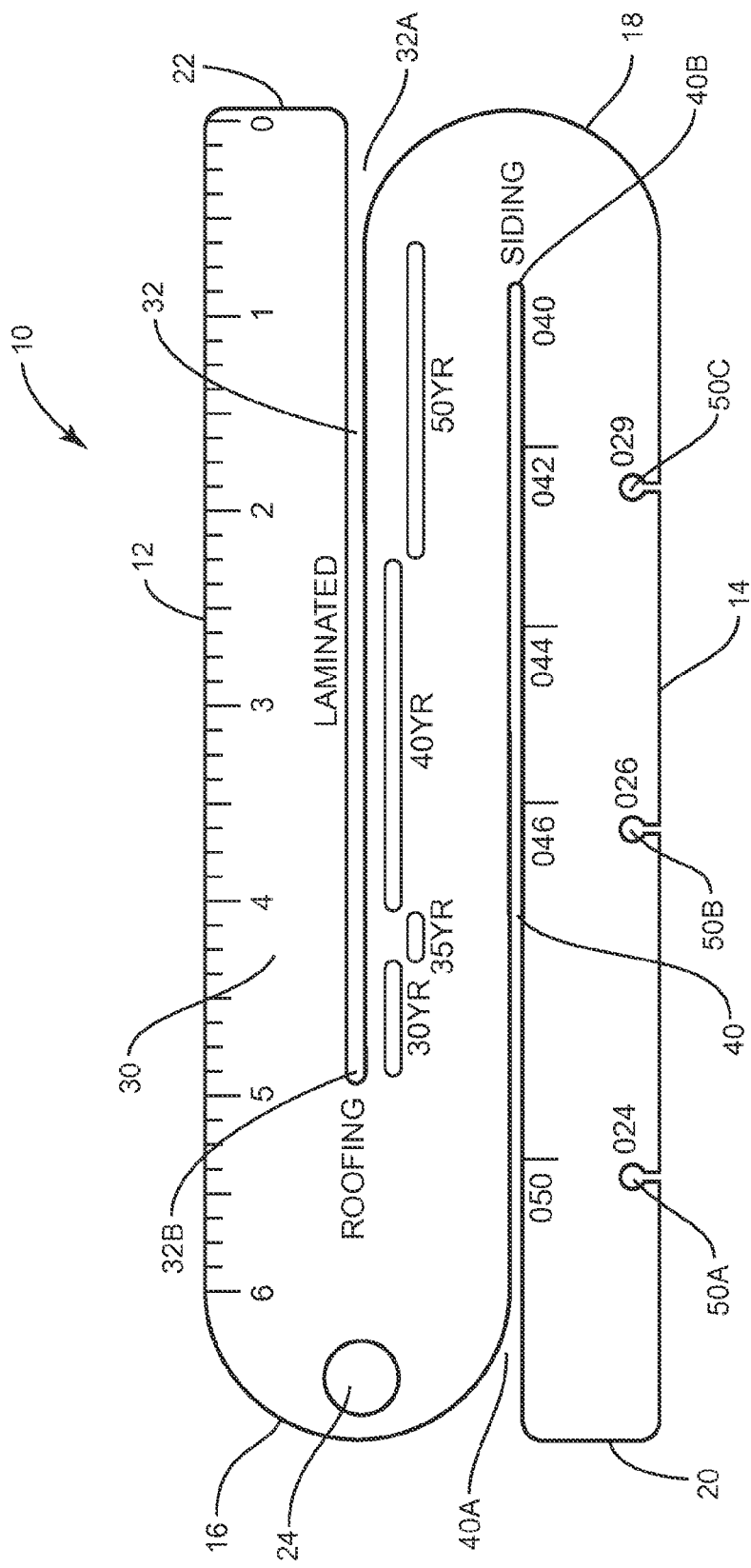
FIG. 1 is a plan view of the gauge of the present invention showing a first or front side thereof.

With further reference to the photographs, the gauge instrument of the present invention is shown therein and indicated generally by the numeral 10. Gauge instrument 10 can be constructed of various materials. However in the embodiment illustrated herein, the gauge instrument 10 is constructed of metal. The gauge instrument 10 can assume various sizes and shapes but in this embodiment, the instrument is designed to be hand held and is relatively thin.

Viewing the gauge instrument 10 from a structural point of view, the instrument includes edges 12 and 14. Edge 12 can be referred to as a top edge while edge 14 can be referred to as a bottom edge. Formed on opposite sides of the instrument 10 is a pair of curved edges 16 and 18. In addition there are two additional edges 20 and 22. An opening 24 is formed in the instrument 10. Opening 24 enables a chain or other connector to be inserted there through.

As shown in FIG. 1, a first or front side of instrument 10 is exposed. Formed along a top portion of the instrument 10 is a ruler or measuring segment 30. In the embodiment illustrated herein, the ruler or measuring segment 30 comprises a six inch roller. Throughout the six inch span there is provided indicia that divides the inch segments into appropriate subdivisions. It is appreciated that the ruler or measuring segment 30 could be of various lengths and other scales, such as a metric scale.

Instrument 10 includes a roofing slot 32. Roofing slot 32 is designed to measure the thickness of various types of roofing shingles. Slot 32 includes an open end 32A and a closed end 32B. As will we be appreciated from subsequent portions of the disclosure, roofing shingle samples or specimens are inserted into the open end 32A and moved through the slot 32 towards the closed end 32B. Once the slot 32 closes onto the sample or specimen shingle and there is significant resistance to further move it towards the closed end 32, then this establishes the thickness of the specimen or sample shingle being measured.

Note that the roofing slot 32 includes two opposed edges. These edges are not parallel but they precisely converge or move slightly inwardly towards each other from the open end 32A to the closed end 32B. Expressed in another way, the width of the slot 32 becomes progressively smaller from the open end 32A towards the closed end 32B.

As seen in FIG. 1, there is indicia placed or inscribed adjacent the roofing clot 32. This indicia is used to determine the thickness of a particular sample or specimen roofing shingle. There are various classes of roofing shingles. For example instrument 10 is designed to measure the thickness of three different classes of roofing shingles, laminated, three tab organic, or three tab fiberglass. The indicia provided adjacent slot 32 on the first or front side (see FIG. 1) of the instrument 10 indicates thickness for the laminated class of roofing shingle. In this case, depending upon the thickness of the roofing shingle, the roofing shingle may be termed a 30 year shingle, 35 year shingle, 40 year shingle, or 50 year shingle. Note in FIG. 1 whereon the first side or face side of the instrument 10, adjacent the roofing slot 32, there is provided four milled segments that extend along the slot. One segment represents a 50 year shingle, the next segment indicates a 40 year shingle, the next segment represents a 35 year shingle and finally there is a fourth segment that represents a 30 year shingle. Thus if the leading edge of the sample or specimen shingle stops above the 40 year segment then it is determined that based on the thickness of this shingle that it is a 40 year shingle. Likewise if a sample shingle is inserted into the open end 32A and can be moved all the way down the slot 32 until resistance is encountered at a point very close to the closed end 32B and above the 30 year segment, then it is determined that this is a 30 year shingle.

Figure 2:
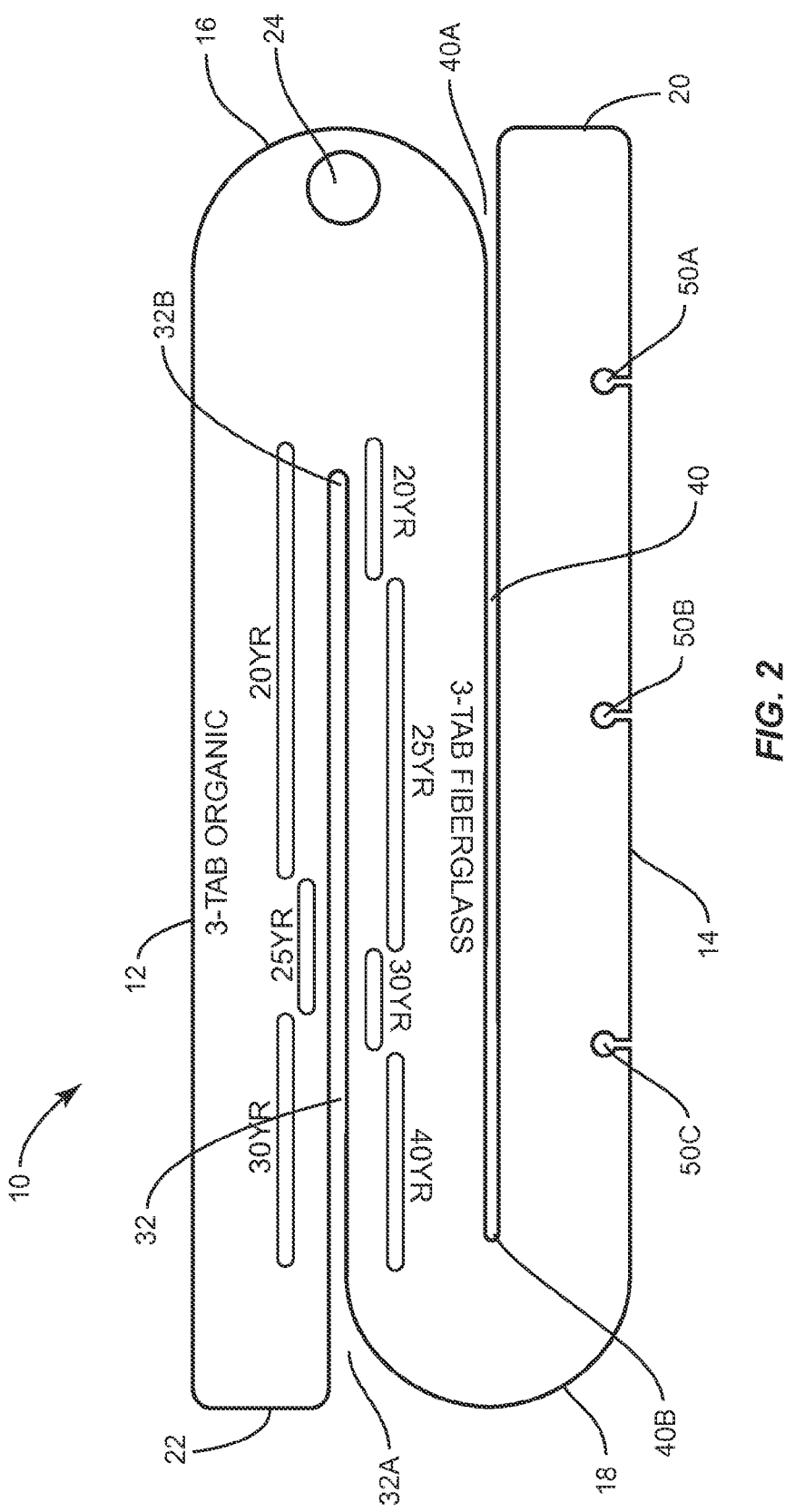
FIG. 2 is a plan view of the opposite side of the gauge.

The second side or the back side of the instrument 10 is shown in FIG. 2. Note that there are two separate thickness scales disposed on opposite sides of the slot 32. The upper scale is for the three tab organic shingle. Note that there are only three milled segments here, a 20 year segment, 25 year segment and a 30 year segment. On the opposite side of the slot 32 there is a scale that addresses the three tab fiberglass shingle. Here there are four segments, a 20 year segment, a 25 year segment, a 30 year segment, and a 40 year segment. The thickness of three tab organic and three tab fiberglass shingles are determined in the same manner as discussed above.

It is important to identify the type or class of shingle involved and then to insert the sample or the specimen into the open end 32A of the roofing slot 32 and then slide the specimen or sample shingle towards the closed end 32B until significant resistance is experienced. Then one identifies where the leading edge of the sample or specimen shingle is along the slot and then determines what year segment properly identifies the specimen or sample shingle in the slot.

Also formed in the gauge instrument 10 is a vinyl siding slot 40. Slot 40 includes an open end 40A and a closed end 40B. There are two edges that define the vinyl siding slot 40. These edges are not parallel but from the open 40A towards the closed end 40B the edges of the slot become progressively narrow. Slot 40 is specifically machined or designed to accommodate conventional samples of vinyl siding. In this particular case, the thickness or width of the slot 40 varies from about 0.050 inch to about 0.040 inch. See FIG. 1. In between these extremes there is indicia marked 0.046, 0.044 and 0.042. As discussed with respect to roofing shingles, the sample or specimen piece of vinyl siding is inserted at the open end 40A of the slot 40 and is moved down the slot towards the closed end 40B until significant resistance is experienced. Where the leading edge of the sample or the specimen stops establishes the thickness of the vinyl siding.

In addition the instrument 10 of the present invention is designed to measure the thickness of metal roof panels. To achieve this, the instrument 10 is provided with three slots 50A, 50B and 50C. Each slot includes a pair of edges. The slot is open along edge 14 of the instrument and the inner end of each slot 50A, 50B and 50C opens to a relatively small circular opening. In this case the edges of the slots are parallel and are precisely formed into the instrument 10. The slots 50A, 50B and 50C can be of various thicknesses to accommodate various other building materials. In this case however the slots 50A, 50B and 50C have a thickness of 0.024, 0.026 and 0.029 inches respectively. These are standard thicknesses for metal roofing panels sold in the United States. Thus when attempting to determine the thickness of a metal roof panel, a specimen is inserted into one or more of the slots 50A, 50B and 50C. With some experience, a person using the gauge 10 will be able to immediately determine the proper thickness of the metal roofing panel. It follows that if the thickness of the specimen or sample panel is greater than the width of a particular slot, then it follows that the sample or specimen will not slide into the slot and hence that particular slot does not indicate the appropriate thickness of the sample or specimen being measured. Also if there is significant looseness or play that exists between the specimen or sample and the slot, then one knows that this is not the correct slot and that the thickness of the metal roofing panel is smaller than this slot would indicate. Finally, one of the slots will accept the sample or specimen metal roofing panel and it will be clear that the width between the edges of the slot precisely or with near precision match the thickness of the metal roofing panel.

There are many advantages to the gauge instrument 10 of the present invention. It is small, easy to handle and can be carried by insurance adjusters. Importantly it is multi-functional in that the gauge instrument 10 can measure and determine the thickness of various building products and classes of individual building products. As discussed herein, it is appreciated that the instrument 10 is able to measure the thickness or gauge for a wide variety of roofing shingles, vinyl siding and metal roofing panels.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A gauge for measuring the thickness of both vinyl siding and roof shingles comprising:
 a main body having a relatively thin thickness, a bottom edge, a top edge, and first and second side edges;
 a roof shingle measuring slot open to the first side edge and extending therefrom across the main body towards the second side edge and terminating short of the second side edge at a first terminating point;
 the roofing shingle measuring slot being wider at the first side edge than at the terminating point and wherein the width of the roofing shingle measuring slot progressively decreases from the first side edge to the first terminating point;
 indicia provided along and adjacent the roofing shingle measuring slot indicating the width of the roofing shingle measuring slot whereby the thickness of a sample roofing shingle is determined at a point in the roofing shingle measuring slot that is sufficiently thin to prevent the sample roofing shingle from passing;
 a vinyl siding measuring slot for measuring the thickness of a sample of vinyl siding extending across the main body of the gauge;
 the vinyl siding measuring slot extending parallel to the roofing shingle measuring slot;
 the vinyl siding measuring slot being open to the second side edge of the main body and extending therefrom across the main body towards the first side edge and terminating at a second terminating point short of the first side edge;

wherein the thickness of the vinyl siding measuring slot progressively decreases from the second side edge to the second terminating point; and indicia provided along and adjacent the vinyl siding measuring slot indicating the thickness of the slot whereby the thickness of a sample piece of vinyl siding is determined at a point in the vinyl siding measuring slot that is sufficiently thin to prevent the sample vinyl siding from passing.

2. The gauge of claim 1 including a series of slots for measuring the thickness of metal roof panels.

3. The gauge of claim 2 wherein the series of slots for measuring the thickness of metal roof panels is formed along the top or bottom edge of the gauge.

4. The gauge of claim 3 wherein the slots for measuring the thickness of metal roof panels communicate with a circular opening formed in the gauge adjacent the top or bottom edge of the gauge.

5. The gauge of claim 1 wherein the first side edge of the gauge includes a first curved segment and a first straight segment.

6. The gauge of claim 5 wherein the second side edge of the gauge includes a second curved segment and a second straight edge.

7. The gauge of claim 6 wherein the first and second curved segments lie diametrically opposed and wherein the first and second straight segments lie diametrically opposed.

8. The gauge of claim 7 wherein the roofing shingle measuring slot and the vinyl siding measuring slot form demarcations that separate the first and second curved segments from the first and second straight segments.

9. The gauge of claim 1 including a measuring rule formed on the main body.

10. The gauge of claim 1 wherein the indicia adjacent and along at least one of the slots comprises a series of spaced apart depressions formed to the main body.

11. The gauge of claim 10 wherein the depressions comprise milled segments.

* * * * *